May 12, 1931.   E. E. WEMP   1,804,903
LEVER BOOSTER
Filed March 31, 1927   2 Sheets-Sheet 2
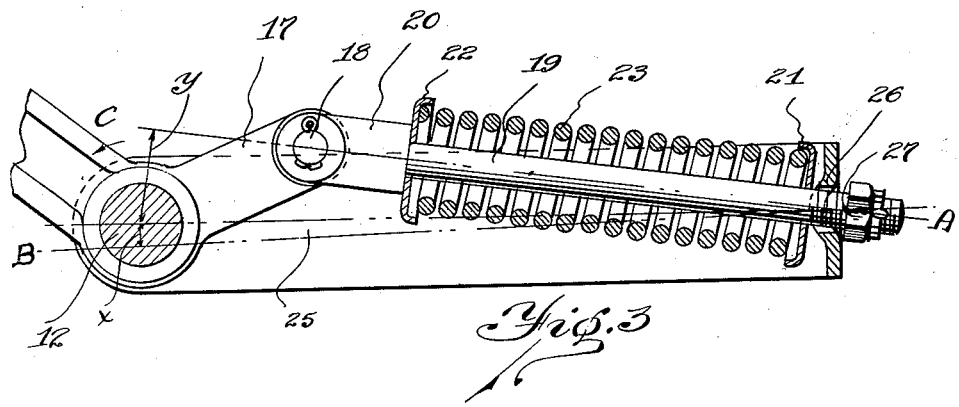
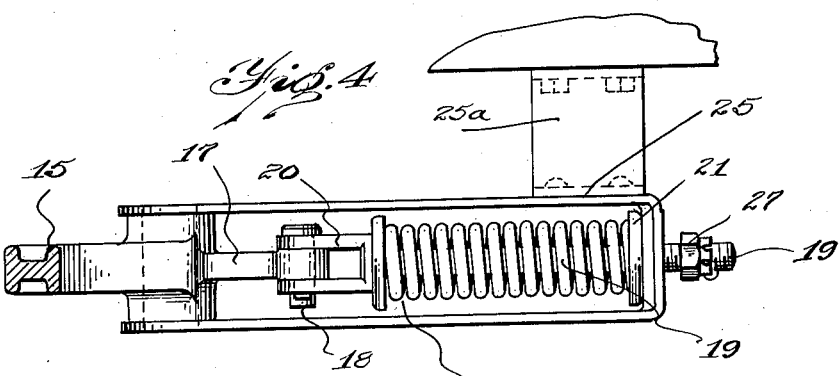
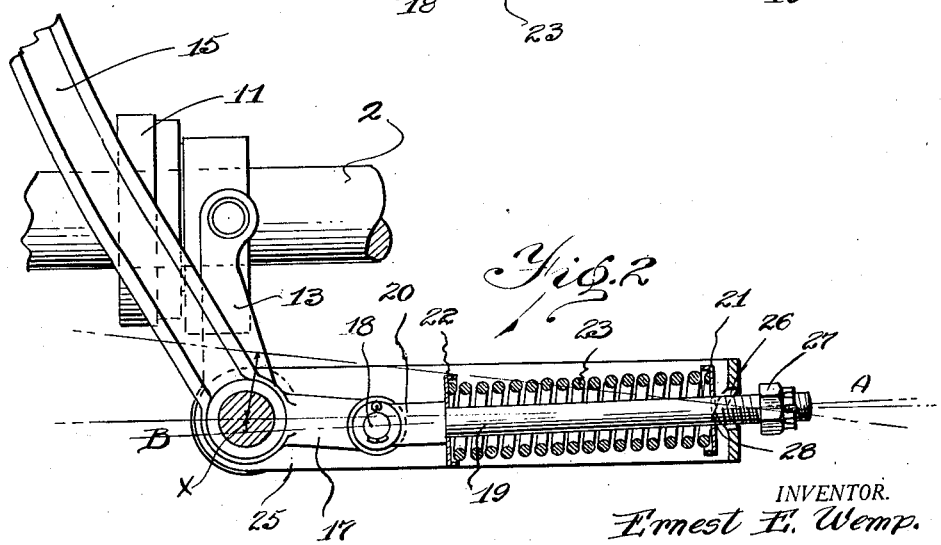
INVENTOR.
Ernest E. Wemp.
BY
Stuart C. Barnes
ATTORNEY.

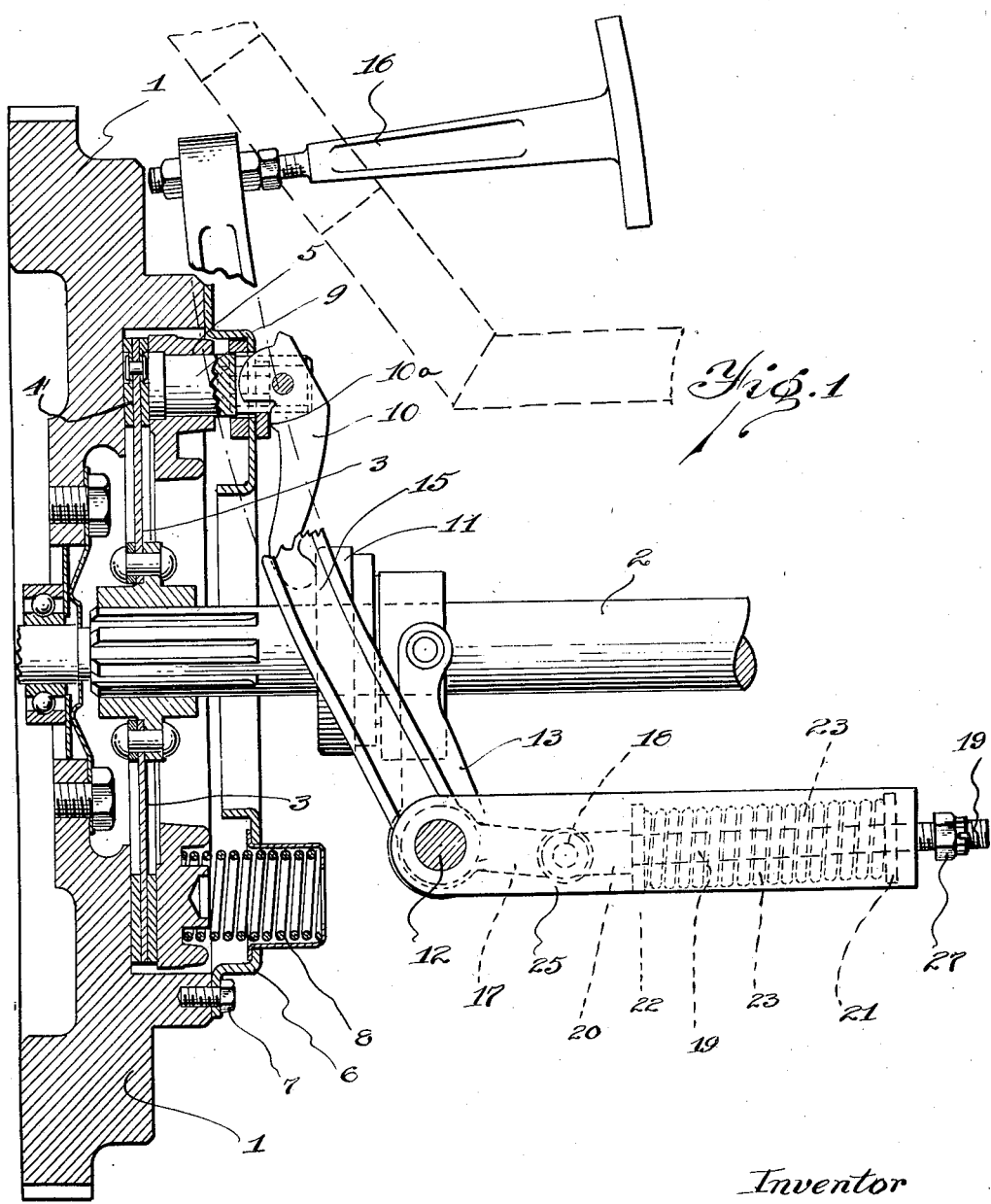

Patented May 12, 1931

1,804,903

UNITED STATES PATENT OFFICE

ERNEST E. WEMP, OF DETROIT, MICHIGAN

LEVER BOOSTER

Application filed March 31, 1927. Serial No. 179,824.

This invention relates to a lever booster designed to exert force upon a lever or similar machine in a manner to aid or assist the power applied to the lever.

Such a device is capable of use with various kinds of levers, and it is adaptable for use with a foot lever of an automobile. Accordingly, I have found it advantageous to show this invention in the accompanying drawings as applied to a clutch lever for an automobile.

In the accompanying drawings:

Fig. 1 is a view taken through a clutch construction, showing the operating clutch lever and the lever booster.

Fig. 2 is a side view of the lever and booster showing the parts in normal position with the clutch engaged.

Fig. 3 is a side view of the booster device showing the same in the position it assumes when the clutch lever is depressed to disengage the clutch.

Fig. 4 is a top plan view of the booster device.

Referring to Fig. 1, a fly wheel of an engine is shown at 1 and a driven shaft at 2. Secured to the driven shaft is the driven member 3 of a clutch which has suitable frictional facing material 4, and this driven member is engaged between the fly-wheel and a second driving element 5. This driving element 5 is secured to the fly-wheel through the means of a cover 6 bolted to the fly-wheel as at 7. Springs 8 are interposed between the cover and the element 5. Pins 9 are secured to the element and extend out through the cover and have secured thereto levers 10 which are engaged by the ring element 11 and which fulcrum as at 10a. A rock shaft 12 is rocked by a lever 15, and through the means of connecting member 13 the ring member 11 is reciprocated. The clutch construction thus far described forms the subject matter of another application and need not be further detailed here. In the operation of the clutch, the member 11 is moved from right to left by depressing the clutch lever, rocking the levers 10 on fulcrum points 10a, thus retracting the pins and the driving element 5 to release the clutch against the compression springs 8. Upon release of the clutch lever the springs 8 force the member 5 forwardly and again engage driving connection.

The clutch lever 15 is secured to the rock shaft 12 which has the usual foot engaging pedal 16. This lever has a projecting portion 17 which is pivotally connected by means of a pin 18, to a rod member 19. For this purpose the rod member 19 has a bifurcated end as shown at 20. The member 15 is not, technically speaking, a lever, but this member, together with the rock shaft and member 13, is the equivalent of a lever.

This rod member is provided with spring retainers 21 and 22, and the coil compression spring 23 encircles a part of the rod and is held within the spring retainers. A bracket member 25 which may be advantageously of elongated U-shape, has the ends of its U connected to the rock shaft with its legs extending along opposite sides of the extension 17 of the foot pedal and the rod 19. The bight portion of this bracket is provided with an opening 26 and the end of the rod 19 extends out through this opening and is screw threaded and provided with a nut 27. Near this opening, the bight portion of the member 25 is rounded inwardly as at 28, to form a suitable bearing for the spring retainer 21; the purpose of this will presently appear. This bracket is held in fixed position and for this purpose may be secured to a part of the engine or transmission housing by a support 25a.

In describing the operation of the device, it is thought that the inclusion of a concrete example will be a help. In an advantageous form of the structure the spring 23 is about four inches long when in the position shown in Fig. 2, and in this position exerts an expanding pressure of approximately three hundred pounds. This pressure, when the parts are in the position shown in Fig. 2, is exerted along the line AB. It will be noted that this line of exertion is off center; that is, off a center line through the pivot 18 and the shaft 12, so that it creates a turning moment X. The value of X may advantageously be about two-tenths of an inch. The lever 15, in the concrete example, is twelve inches long, and therefore the three hundred pounds pressure of the spring exerts a pressure of five pounds at the pedal 16. Thus, an application of five pounds from the foot of the operator on the pedal 16 overcomes the action of the spring. It will be seen that in this normal position the spring 23 acts to turn the foot lever and the rock shaft in a clockwise position (viewing Fig. 2), thus holding the foot lever in inoperative position. It has been the custom to merely attach a tension spring to the lever and to a stationary part of the automobile for holding the lever in inoperative position. Such tension springs, however, pull with a progressively increasing force as the lever is depressed, thus adding more and more force which the operator must overcome, in addition to the increasing force offered by the springs of the clutch mechanism.

When the pedal 16 is depressed to release the clutch the driving member 5 is retracted against the compression springs 8 as has heretofore been described. The lever now takes the position as shown in Fig. 3. In this position, according to the concrete example selected, the spring 23 has increased in length and its pressure has been reduced to approximately two hundred fifty pounds. This two-hundred-fifty-pound force is exerted on line AC which is off center in the opposite direction from the line AB. This creates a turning moment Y of the rock shaft 12 in a counter clockwise direction. In the concrete example selected, Y equals one inch, approximately, so that the effort of the spring at the pedal 16 is approximately twenty-one pounds in a counter clockwise direction. Such clutch constructions as are used in automobiles ordinarily require a pressure of thirty-eight pounds, or thereabouts, on the pedal 16 when the lever is fully depressed. With the use of the booster of this invention, twenty-one pounds of this thirty-eight are furnished by the spring, thus relieving the operator so that the operator need exert only seventeen pounds in fully depressed position.

It will be noted that the moment X holds the lever in inoperative position and must be overcome by the operator when the lever is first depressed. However, as soon as the pivot point 18 passes the center line, the action of the spring on the rock shaft is in the opposite direction and aids the depression of the lever in a progressively increasing manner as the moment Y increases. It will be understood, of course, that the springs in the clutch construction are such as to overcome the spring 23, so that when the operator releases the pedal after it has been depressed, the springs in the clutch cause the rock shaft to move in a clockwise direction and compresses the spring 23 until the parts again assume the position as shown in Fig. 2.

Claims:
1. The combination with a clutch having packing springs, a lever for operating the clutch which is mounted upon a shaft, an arm on the lever, a link pivotally connected to the arm, a U-shaped bracket having its legs supported by the shaft, the bight portion of the bracket being provided with an opening through which the link slidably extends, a compression spring mounted on the link which is backed up at one end by the bight portion of the bracket, and means confining the opposite end of the compression spring so that it acts upon the pivotal connection between the link and the arm, whereby upon actuation of the lever the link and arm swing into angular position with respect to each other and the force of the compression spring is communicated to the lever through the said arm.

2. The combination with a clutch having packing springs, a lever operable against the action of the springs to release the clutch, an arm rigid with the lever, a spring acting upon this arm, said spring and arm being disposed so as to operate over a center line through the arm and spring, said arm and spring in normal clutch engaged position of the lever being disposed so that the spring creates a turning moment upon the lever reverse to that of lever movement during clutch disengagement and so that in initial movement of the lever for clutch disengagement the arm and spring move over said center line whereby the turning moment exerted upon the lever by the spring is in the direction of lever movement for clutch disengagement whereby to aid in the movement of the lever for clutch disengagement.

In testimony whereof I affix my signature.
ERNEST E. WEMP.